United States Patent
Moreno Rueda et al.

(10) Patent No.: US 9,366,431 B2
(45) Date of Patent: Jun. 14, 2016

(54) METHOD AND APPARATUS FOR THE CONVEYANCE, COOLING AND ENERGY RECUPERATION OF HOT MATERIAL

(75) Inventors: Rafael Moreno Rueda, Alpen (DE); Ge Hongmin, Beijing (CN); Ma Hongjuan, Beijing (CN); Liu Johnson, Beijing (CN)

(73) Assignee: Clyde Bergemann Drycon GMBH, Wesel (DE)

( * ) Notice: Subject to any disclaimer, the term of this patent is extended or adjusted under 35 U.S.C. 154(b) by 1062 days.

(21) Appl. No.: 13/497,761

(22) PCT Filed: Sep. 28, 2010

(86) PCT No.: PCT/EP2010/064336
§ 371 (c)(1),
(2), (4) Date: Jul. 18, 2012

(87) PCT Pub. No.: WO2011/039165
PCT Pub. Date: Apr. 7, 2011

(65) Prior Publication Data
US 2012/0276486 A1    Nov. 1, 2012

(30) Foreign Application Priority Data
Sep. 29, 2009  (CN) .......................... 2009 1 0178566

(51) Int. Cl.
*B09B 3/00* (2006.01)
*F23J 1/00* (2006.01)
*F23J 1/02* (2006.01)
*F23L 15/00* (2006.01)

(52) U.S. Cl.
CPC ..... *F23J 1/00* (2013.01); *F23J 1/02* (2013.01); *F23J 2900/01002* (2013.01); *F23L 15/00* (2013.01)

(58) Field of Classification Search
CPC ................. F23L 15/00; F23J 1/00; F23J 1/02
USPC ........ 431/11, 161; 110/341, 168, 166, 165 R, 110/189; 165/104.18
See application file for complete search history.

(56) References Cited

U.S. PATENT DOCUMENTS

| | | | | | |
|---|---|---|---|---|---|
| 3,550,920 | A | * | 12/1970 | Foerster | ................. C21D 9/567 165/104.15 |
| 4,723,494 | A | * | 2/1988 | Kerr | .............................. 110/259 |
| 4,765,256 | A | * | 8/1988 | Caughey | ....................... 110/229 |

(Continued)

FOREIGN PATENT DOCUMENTS

WO    2008142594 A2    11/2008
WO    2009104212 A1    8/2009

*Primary Examiner* — Gregory Huson
*Assistant Examiner* — Nikhil Mashruwala
(74) *Attorney, Agent, or Firm* — BainwoodHuang

(57) ABSTRACT

Techniques convey, cool and energy recuperate hot material from a combustion boiler of a combustion plant. Such techniques involve:
a) issue of the hot material from a material issue orifice of a combustion boiler into a capture region of a housing, a conveyor belt being arranged in the housing,
b) conveyance of the hot material through a cooling region in the housing,
c) cooling of the hot material in the cooling region by means of a cooling-air stream moving in the opposite direction to the material,
d) removal of at least part of the heated cooling-air stream out of at least one region adjacent to the capture region of the housing, and
e) delivery of the removed cooling-air stream to at least one region, carrying combustion exhaust gases, of the combustion plant.

21 Claims, 1 Drawing Sheet

(56) References Cited

U.S. PATENT DOCUMENTS

| | | | | |
|---|---|---|---|---|
| 6,003,475 A | * | 12/1999 | Elsner | F22B 31/045 110/245 |
| 6,230,633 B1 | | 5/2001 | Magaldi et al. | |
| 8,733,255 B2 | * | 5/2014 | Moreno Rueda et al. | 110/165 R |
| 2005/0115477 A1 | | 6/2005 | Magaldi et al. | |

* cited by examiner

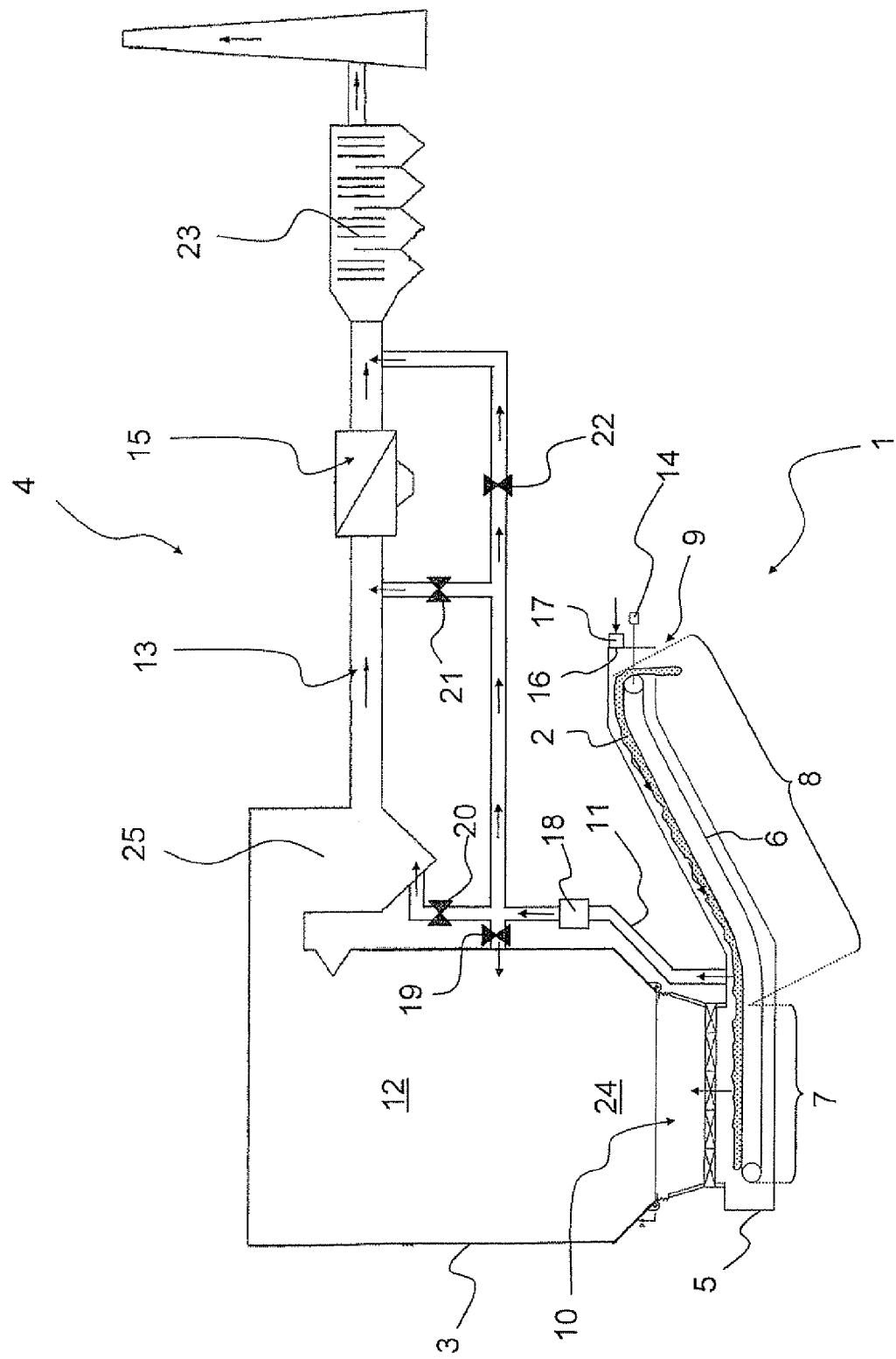

METHOD AND APPARATUS FOR THE CONVEYANCE, COOLING AND ENERGY RECUPERATION OF HOT MATERIAL

The present invention relates to a method and an apparatus for the conveyance, cooling and energy recuperation of hot material. The invention is used particularly in plants having at least one combustion boiler, for example plants for the combustion of fossil fuels and/or waste incineration plants.

When ash, slag or combustion residues, also designated hereafter as "material", are being transported away, it is particularly important, on the one hand, to achieve by cooling a controlled solidification or consolidation of the hot, sometimes still molten materials, so that, in particular, a conveyance or a further processing of these materials after they have been drawn off from the combustion boiler becomes possible. Furthermore, it is also desirable to utilize the energy still contained in the hot material and consequently to improve the overall efficiency of the plant or the combustion boiler.

It was initially assumed that quenching in a water bath is first necessary for conveying the hot materials (what is known as wet discharge). For this purpose, however, large quantities of water were required, which, particularly in dry regions, were not readily available. Moreover, the water used had to be purified at high outlay. There has therefore been a change since the 90's to what are known as dry draw-off systems. In this case, the hot material is laid onto conveyor belts and is transported further on there, a controlled cooling of the hot material on the conveyor belt being carried out. These conveyor belts are usually designed to be encapsulated with respect to the external surroundings, that is to say have a housing which prevents the combustion gases, which still occur during the treatment of the material, from being able to escape readily into the surroundings. Moreover, the combustion boilers are operated predominantly with a slight vacuum, so that the combustion gases produced from the material are drawn off towards the combustion boiler by means of a corresponding suction draught.

In order to achieve a sufficient cooling of the material, relatively long conveying distances for the material are required, as compared with wet discharge. In particular, conveyor belts or draw-off devices arranged one behind the other are often proposed, ash comminutors and intermediate bunkers being arranged between these for a further improvement in cooling. These designs, however, must take into account the fact that a considerable construction space must regularly be available for this purpose. Moreover, it should not be forgotten that, precisely by the provision of an ash comminutor or intermediate bunker between two conveyor belts or cooling stages, an increased outlay in terms of apparatus and, with regard to the coupling of the systems, special requirements with regard to the leak-tightness of these systems, even under high thermal and/or dynamic alternating stresses, are necessary. Furthermore, the energy extracted from the material during cooling is usually not used to increase the overall efficiency of the combustion plant.

Proceeding from this, the object of the present invention is at least partially to solve the problems outlined with regard to the prior art. In particular, a method for the conveyance, cooling and energy recuperation of hot material is to be specified, which ensures a sufficient cooling of the hot material over a comparatively short conveying distance and as effective an energy recuperation as possible. In addition, an apparatus for the conveyance, cooling and energy recuperation is also to be specified, which ensures a sufficient cooling of the hot material over a comparatively short conveying distance and as effective an energy recuperation as possible.

These objects may be achieved by a method and an apparatus having certain features which are disclosed herein. Further advantageous refinements of the invention are specified herein. It should be pointed out that the features disclosed herein may be combined with one another in any desired technologically expedient way and define further refinements of the invention. Furthermore, certain features and preferred refinements of the invention are illustrated.

The method according to the invention for the conveyance, cooling and energy recuperation of hot material from a combustion boiler of a combustion plant comprises at least the following steps:

a) issue of the hot material from a material issue orifice of a combustion boiler into a capture region of a housing, a conveyor belt being arranged in the housing,
b) conveyance of the hot material through a cooling region in the housing,
c) cooling of the hot material by means of a cooling-air stream moving in the opposite direction to the material in at least one of the following regions:
   the cooling region,
   the capture region or
   a material issue orifice,
d) removal of at least part of the heated cooling-air stream out of at least one region adjacent to the capture region of the housing,
e) delivery of the removed cooling-air stream to at least one region, carrying combustion exhaust gases, of the combustion plant.

According to steps a) and b), the hot material, such as ash, slag or combustion residues, etc., is first delivered to a conveyor in a capture region of the housing and is subsequently conveyed with the aid of the conveyor belt through a cooling region to an outlet (conveying direction). The cooling region is that region of the housing through which the essential part of the cooling air flows opposite to the conveying direction of the material. So that the required conveying distance of the material through the cooling region can be configured so as to be as small as possible, it is necessary to cool the hot material in the cooling region as quickly as possible. For this purpose, the hot material in the cooling region is cooled, according to step c), by means of a cooling-air stream moving in the opposite direction to the material, wherein, to achieve sufficient cooling, the required volume flow of the cooling air must be the higher, the shorter the conveying distance through the cooling region in the housing is.

Since, after the cooling of the material, the cooling-air stream at least partially enters the combustion space of the combustion boiler through the material issue orifice in the combustion boiler as a result of the vacuum in the latter (regularly up to a maximum quantity of 5% [percent by weight] of the air quantity required for stoichiometric combustion in the combustion boiler), the volume flow of cooling air cannot be increased as desired without the combustion reactions in the combustion boiler being adversely influenced. Consequently, stoichiometric combustion could be undesirably influenced there or complicated regulation on account of fluctuating volume flows of the cooling air entering could become necessary.

50 that the hot material (for example, using a single conveyor belt) can nevertheless be cooled by a high volume flow of cooling air, according to step d) at least part of the cooling-air stream has to be removed out of a region adjacent to the capture region of the housing, so that the cooling-air stream entering the combustion boiler is not too great. The capture region of the housing is the region into which the hot material falls through the material issue orifice of the combustion boiler onto the conveyor belt. The at least partial removal of the cooling-air stream out of the region adjacent to the capture region of the housing may take place at a plurality of locations on the housing, for example on the entire circumference of the housing, in order to achieve a particularly uniform removal of the cooling-air stream.

That fraction of the cooling-air stream which is removed out of a region adjacent to the capture region of the housing can be regulated or adapted (if appropriate, dynamically) to at least one of the following process parameters:
- the quantity and/or temperature of the hot material to be cooled,
- the temperature of the cooling-air stream to be removed,
- the temperature of the ambient air used as cooling air,
- different load states of the combustion plant,
- the conveying speed of the hot material,
- the degree of contamination of heat exchange surfaces connected to the combustion plant,
- the combustion exhaust gas temperature,
- a pressure difference between a cooling-air shaft and the capture region,
- a pressure difference between the cooling-air shaft and the material issue orifice,
- flow velocity of the cooling-air stream in the cooling-air shaft,
- flow velocity of the cooling-air stream in the capture region,
- flow velocity of the cooling-air stream in the material issue orifice.

In order to increase the overall efficiency of the combustion plant, moreover, according to step e) the removed part of the cooling-air stream is delivered to at least one region carrying combustion exhaust gases, in order to make it possible to utilize the energy stored in the removed part of the cooling-air stream, for example by means of a following heat exchanger. It is nevertheless also possible to deliver only a specific part of the removed part of the cooling-air stream to at least one region carrying combustion exhaust gases and to discharge the remaining part of the removed part of the cooling-air stream (if appropriate, after purification treatment) into the atmosphere.

It is preferable, in particular, to deliver the removed part of the cooling-air stream to a region carrying combustion exhaust gases only when the temperature of the removed part of the cooling-air stream is higher than or equal to the temperature of the combustion exhaust gases carried in the region carrying combustion exhaust gases. If the temperature of the removed part of the cooling-air stream falls below the energy level of the combustion exhaust gases carried in the region carrying combustion exhaust gases, the removed part of the cooling-air stream is preferably delivered to another region carrying combustion exhaust gases, in which combustion exhaust gases are carried at temperatures lower than or equal to those of the removed part of the cooling-air stream, or to the atmosphere. In other words, preferably, a dynamic, controlled and variably placed delivery of the removed part of the cooling-air stream takes place into regions of a region, carrying combustion exhaust gases, of a combustion plant, in which region the temperature of the combustion exhaust gases is lower than or equal to that of the removed part of the cooling-air stream, or, should this not be possible, into the atmosphere.

Moreover, it is considered to be advantageous that at least part of the heated cooling-air stream is removed out of a region which is arranged below the combustion boiler at the capture region of the housing and which the material conveyed on the conveyor belt reaches after a conveying distance of at most 5 m, preferably at most 3 m or particularly preferably at most 1 m.

Since the cooling-air stream moves opposite to the conveying direction of the material, the more energy can be recuperated, the shorter the conveying distance of the hot material after it leaves the capture region of the housing is, since, in this region, the heat energy transferred to the cooling-air stream as a result of convection is the greatest.

Moreover, it is considered to be advantageous that such a large fraction of the cooling-air stream is removed that a fraction of the cooling-air stream enters the combustion boiler through the material issue orifice which corresponds to at most 1.5% [percent by weight], preferably at most 0.5% and in particular preferably at most 0.1%, of the air quantity which is required for stoichiometric combustion in the combustion boiler. In this case, the air quantity required for stoichiometric combustion is directly supplied (separately) to the combustion boiler.

The cooling-air stream entering the combustion boiler is limited in order to prevent it from adversely influencing the combustion reactions taking place in the combustion boiler. What is achieved thereby is, in particular, that the fuels are converted completely and the combustion exhaust gases occurring during combustion have low pollutant concentrations.

Moreover, in the method proposed here, it is considered to be advantageous that the removed part of the heated cooling-air stream is larger than the part which is delivered to the combustion boiler through the material issue orifice.

As a result, the selected volume flow of cooling air for cooling the hot material in the cooling region of the housing can be markedly higher and, consequently, the cooling of the material can take place in a markedly shorter cooling region. In particular, the removed fraction of the cooling air amounts to a multiple of the fraction which enters the combustion boiler via the material issue orifice, for example is at least twice or at least four times as large. If appropriate, the entire cooling air may also be removed (intermittently). The fraction of the removed cooling air corresponds, for example, to at least 80% [percent by weight] or even to more than 95% of the cooling air supplied to the housing.

If appropriate, it is also expedient to carry out a check of the cooling air supplied to the housing, in order to carry out suitable flow influencing and/or extraction of cooling air. Thus, for example, measuring instruments may be provided, in order to determine and/or calculate the quantity of cooling air entering and/or drawn off. This information or these measurement results can be supplied to a check unit which, for example, then actuates actuating means (during operation, in particular dynamically) and sets or varies the coolant stream in the housing and/or in the cooling shaft.

According to a further aspect of the invention, an apparatus for the conveyance, cooling and energy recuperation of hot material from a combustion boiler of a combustion plant is also proposed. This apparatus has a conveyor belt arranged in a housing, this housing having a capture region and a cooling region, and the housing having at least one outlet, and, further, a material issue orifice of the combustion boiler being arranged above the capture region of the housing, and the apparatus having at least one cooling-air shaft which connects a region adjacent to the capture region of the housing in the conveying direction of the material to at least one region, carrying combustion exhaust gases, of a combustion plant.

The method according to the invention and the apparatus according to the invention may (partially) also be implemented together.

The apparatus constitutes, in particular, what is known as a draw-off or encapsulated plate conveyor or the like, the housing of which is coupled to at least one cooling-air shaft. In any event, the apparatus is an apparatus which performs what is known as a "dry" conveyance of the material out of the combustion boiler. What is meant by "material" is, in particular, combustion residues, in particular ash, which are discharged (directly) out of the combustion boiler through a material issue orifice onto the conveyor belt. In this case, the material has approximately a temperature in the range of 600° C. to 1000° C., in particular in the range around 800° C. The "combustion boiler" may be, for example, one of the boiler types listed below: lignite combustion boiler, hard-coal combustion boiler, waste combustion boiler.

The conveyor belt is preferably designed in the manner of a steel-plate conveyor, in which a multiplicity of steel plates are arranged, overlapping one in the other, in a row in an articulated manner and are moved via (chain) drives or deflecting rollers. Materials which may be considered for the conveyor belt are therefore, in particular, impact-resistant, corrosion-resistant and temperature resistant steels.

This conveyor belt is surrounded by a housing. This housing is connected, essentially gas-tight, to the combustion boiler in the region of the material issue orifice. Below the material issue orifice of the combustion boiler is located the capture region of the housing in which the hot material is discharged onto the conveyor belt. The capture region of the housing is followed by the cooling region of the housing through which the hot material can be conveyed with the aid of the conveyor belt. The housing has, furthermore, an outlet, through which the cooled material can be let out for further processing. The cooling region therefore extends between the capture region and the outlet of the housing.

The proposed apparatus, then, is distinguished, in particular, in that it has a cooling-air shaft which connects a region adjacent to the capture region of the housing in the conveying direction of the material to at least one region, carrying combustion exhaust gases, of a combustion plant. This "region carrying combustion exhaust gases" may be, for example, a combustion chamber of the combustion boiler (also designated below as a furnace space) or a smoke-gas duct following a combustion chamber. It should be added that the cooling-air shaft is preferably connected at a point of the combustion chamber which is located above the regular flame height of the combustion taking place within the combustion boiler (furnace space). Moreover, the cooling-air shaft may have (at least in regions, but preferably over its entire extent) a heat insulation, so that the removed part of the cooling-air stream loses as little heat energy as possible while it is being transported in the cooling-air shaft.

To prevent dirt from adhering, for example soot and the like, the cooling-air shaft may be equipped inside it at least partially with an adhesion-reducing coating. In this case, for example, what are known as nano coatings, etc., may be considered.

Moreover, by at least one flow guide surface being arranged within the cooling-air shaft and/or within the housing with the conveyor belt, a directed flow routing of the removed part of the cooling-air stream can be achieved, in order to prevent dirt from adhering, in particular in regions especially susceptible to dirt, such as corners, edges and regions with a curved flow routing (for example, bends).

Furthermore, means for a (local) increase in the flow velocity of the removed part of the cooling-air stream may be present in the cooling-air shaft, in order likewise to reduce adhesions of dirt.

Since, taking into account the various combustion processes and materials to be burned, adhesions of dirt inside the cooling-air shaft may nevertheless not be avoidable completely, the cooling-air shaft may have cleaning means, for example those which are known from the prior art for the cleaning of combustion boilers and heat exchange surfaces.

In order furthermore, where appropriate, to prevent a situation where dirt particles entrained with the removed part of the cooling-air stream are delivered to a region carrying combustion exhaust gases and further contaminate heat exchange surfaces arranged there, where appropriate, at least one filter for purifying the removed part of the cooling-air stream may be provided in the cooling-air shaft.

It is particularly advantageous if the at least one cooling-air shaft is connected to a region of the housing which lies in the conveying direction of the material at a distance of at most 5 m, preferably at most 3 m or particularly preferably at most 1 m, from the capture region (or the material issue orifice of the combustion boiler) and/or which is preferably located in a region of the housing in which the conveying direction of the hot material runs essentially horizontally. A particularly high energy recuperation is achieved by means of this configuration, because the energy content of the cooling air is the higher, the longer the cooling air has been in contact with the hot material on the conveyor belt or the further the cooling air has flowed in the direction of the capture region.

Moreover, the cooling-air shaft may be mounted simultaneously at a plurality of points on the housing, for example in the form of a circle at regular intervals on the entire circumference of the housing, in order to achieve a particularly uniform removal of the cooling air. Moreover, a plurality of cooling-air shafts may also be provided, which are connected to the housing in different regions along the conveying direction of the hot material, so that cooling air having different energy levels can be removed selectively. Furthermore, flow guide surfaces, for example, blades, may be arranged in the housing of the conveyor belt in the region of the cooling-air shaft, in order to deliver the cooling-air stream to the cooling-air shaft.

It is also advantageous if the at least one cooling-air shaft has means for the directed delivery of removed cooling air to at least one of the following regions of a combustion plant which carry combustion exhaust gases:

combustion chamber,
smoke-gas duct.

According to a further expedient embodiment, an air supply for an airflow towards the cooling region of the conveyor belt is provided in the region of the outlet of the housing or of a separate cooling-air inlet. A directed control of the cooling-air stream flowing into the housing is thereby achieved. It is preferable that only passive means are used here and therefore a suction intake of the cooling air via the boiler and/or a suction-extraction device is provided elsewhere (alone). However, if appropriate, the air supply may also comprise a plurality of (regulateable) valves, blowers and the like.

In another development of the invention, the cooling-air shaft has a conveying device for the cooling air. This conveying device allows the controlled removal of part of the cooling air out of the housing. The conveying device may be designed with at least one (regulateable) valve and/or with a suction device.

The invention and the technical background are explained in more detail below with reference to the FIGURE. It should be pointed out that the FIGURE shows a particularly preferred design variant of the invention, but the latter is not restricted to this.

FIG. 1 shows diagrammatically a design variant of the apparatus suitable for carrying out the method according to the invention.

FIG. 1 illustrates an apparatus 1 for a combustion plant 4 with a combustion boiler 3 which has a combustion chamber 12 and is followed by a smoke-gas duct 13 which carries the smoke gases, occurring during combustion in the furnace space 24 below the combustion chamber 12, to a heat exchanger 15 and to an electrical filter 23. Below the furnace space 24 is located the material issue orifice 10 which is connected, essentially gas-tight, to the housing 5. The hot material 2 falls through the material issue orifice 10 into the capture region 7 of the housing 5. In this capture region 7, the hot material 2 is picked up by an individual conveyor belt 6, which is arranged in the housing 5.

This conveyor belt 6 extends from the capture region 7 as far as the outlet 9 of the housing 5. Between the outlet 9 and the capture region 7 is located the cooling region 8 through which the conveyor belt 6 conveys the hot material 2 from the capture region 7 to the outlet 9 of the housing 5. The conveyor belt 6 is driven here by means of a motor 14. Furthermore, the housing 5 has in the vicinity of the outlet 9 a separate cooling-air inlet 16 (or a plurality of these) which is coupled (only optionally) to a fan 17. A cooling-air stream (illustrated here diagrammatically as arrows) flows from the surroundings through this cooling-air inlet 16 into the housing 5. This cooling-air stream cools the hot material 2 in the cooling region 8 on the counter-current principle, with the result that the cooling-air stream is simultaneously heated up.

In the immediate vicinity of the capture region 7, the cooling region 8 is followed by a cooling-air shaft 11. With the aid of this cooling-air shaft 11, illustrated complexly here, part of the cooling-air stream is removed out of the housing 5. The complex system, shown, of a cooling-air shaft 11 has only one entrance near the capture region 7 of the housing 5 and a plurality of exits, connectable variably (singly/in combination), towards various regions of the combustion plant which carry exhaust gas. This part of the cooling-air stream may correspond, for example, to 0.5% to 2% of the air quantity which is required for stoichiometric combustion in the combustion boiler 3. As a result of this at last partial removal of the cooling-air stream out of the housing 5, the quantity of cooling air entering the combustion chamber 12 of the combustion boiler 3 through the material issue orifice 10 can be limited. At the same time, the cooling-air stream provided can be increased, as compared with known plants, so that a controlled (complete) cooling/solidification of the material 2 by means of only one conveyor belt 6 becomes possible.

So that the fraction of the cooling air removed can be controlled, the cooling-air shaft 11 has a suction device 18. The cooling air is then delivered via the cooling-air shaft 11 to a region, carrying combustion exhaust gases, of the combustion chamber 12 and to various regions of the smoke-gas duct 13. The delivery of the removed cooling air to these regions may be controlled with the aid of a first 19, second 20, third 21 and fourth 22 means for the directed delivery of removed cooling air.

The entire apparatus 1 may, of course, also be modified in order to adapt the removal of the cooling air; for example, individual and/or a plurality of separate cooling-air shafts 11 can be used (towards the combustion space 12, to an empty flue 25 of the combustion boiler 3, to a portion of the smoke duct 13 upstream/downstream/into a heat exchanger 15).

LIST OF REFERENCE SYMBOLS

1 Apparatus
2 Hot material
3 Combustion boiler
4 Combustion plant
5 Housing
6 Conveyor belt
7 Capture region
8 Cooling region
9 Outlet
10 Material issue orifice
11 Cooling-air shaft
12 Combustion chamber
13 Smoke-gas duct
14 Motor
15 Heat exchanger
16 Cooling-air inlet
17 Air supply
18 Suction device
19 First means for the directed routing of removed cooling air
20 Second means for the directed routing of removed cooling air
21 Third means for the directed routing of removed cooling air
22 Fourth means for the directed routing of removed cooling air
23 Electrical filter
24 Furnace space
25 Empty flue

The invention claimed is:

1. Method for the conveyance, cooling and energy recuperation of hot material from a combustion boiler of a combustion plant, comprising at least the following steps:
   a) issuing of the hot material from a material issue orifice of a combustion boiler into a capture region of a housing, a conveyor belt being arranged in the housing,
   b) conveying of the hot material through a cooling region in the housing,
   c) cooling of the hot material by means of a cooling-air stream moving in the opposite direction to the material in at least one of the following regions:
      the cooling region,
      the capture region or
      the material issue orifice,
   d) removing at least part of the heated cooling-air stream out of at least one region adjacent to the capture region of the housing,
   e) delivering the removed cooling-air stream to at least one region, carrying combustion exhaust gases, of the combustion plant by a cooling-air shaft having a plurality of exits connecting variably towards various regions of the combustion plant which carry exhaust gas, wherein a dynamic, controlled and variably placed delivering of the removed part of the cooling-air stream takes place into regions of a region, carrying combustion exhaust gases, of the combustion plant, in which region a temperature of the combustion exhaust gases is lower than or equal to that of the removed part of the cooling-air stream, or, should this not be possible, into an atmosphere.

2. Method according to claim 1, at least part of the heated cooling-air stream being removed out of a region adjacent to the capture region of the housing and which the material conveyed on the conveyor belt reaches after a conveying distance of at most 5 m.

3. Method according to claim 1, such a large fraction of the cooling-air stream being removed that a fraction of the cooling-air stream enters the combustion boiler through the material issue orifice which corresponds to at most 1.5% of the air quantity which is required for stoichiometric combustion in the combustion boiler.

4. Method according to claim 1, the removed part of the heated cooling-air stream being larger than the part which is delivered to the combustion boiler through the material issue orifice.

5. Method according to claim 1, wherein the hot material is cooled in step c) in the cooling region and optionally in the capture region or in the material issue orifice.

6. Method according to claim 5, wherein at least part of the heated cooling-air stream is removed in step e) out of a region of the cooling region.

7. Method according to claim 1, wherein the cooling-air shaft has only one entrance.

8. Method according to claim 1, wherein the cooling-air stream may at least partially enter the combustion boiler in step c) through the material issue orifice during operation.

9. Method according to claim 1, wherein at least part of the heated cooling-air stream is removed in step d) out of at least one region adjacent to the capture region of the housing in a conveying direction of the hot material.

10. Method according to claim 1 wherein the method further comprises:
adjusting multiple air flow controllers to direct delivery of the removed cooling-air stream to different locations of the combustion plant, the multiple air flow controllers controlling air flow to (i) a furnace space of the combustion boiler, (ii) a flue which is disposed between the combustion boiler and a heat exchanger, (iii) a first duct portion disposed between the flue and the heat exchanger, and (iv) a second duct portion disposed between the heat exchanger and a filter.

11. Method according to claim 1, wherein the removed cooling-air stream is delivered to at least one region, carrying combustion exhaust gases, of the combustion plant only when the temperature of the removed part of the cooling-air stream is higher than or equal to the temperature of the combustion exhaust gases carried in the region carrying combustion exhaust gases.

12. Apparatus for the conveyance, cooling and energy recuperation of hot material from a combustion boiler of a combustion plant, having a conveyor belt arranged in a housing, this housing having a capture region and a cooling region, and the housing having at least one outlet, and, further, a material issue orifice of the combustion boiler being arranged above the capture region of the housing, and the apparatus having at least one cooling-air shaft which connects a region adjacent to the capture region of the housing in the conveying direction of the material to at least one region, carrying combustion exhaust gases, of a combustion plant, wherein the at least one cooling-air shaft comprises a plurality of exits connecting variably towards various regions of the combustion plant which carry exhaust gas, wherein a dynamic, controlled and variably placed delivering of the removed part of the cooling-air stream takes place into regions of a region, carrying combustion exhaust gases, of the combustion plant, in which region a temperature of the combustion exhaust gases is lower than or equal to that of the removed part of the cooling-air stream, or, should this not be possible, into an atmosphere.

13. Apparatus according to claim 12, the cooling-air shaft being connected to a region of the housing which lies in the conveying direction of the material at a distance of at most 5 m from the capture region.

14. Apparatus according to claim 12, the at least one cooling-air shaft having means for the directed delivery of removed cooling air to at least a combustion chamber of the combustion boiler of a combustion plant which carries combustion exhaust gases.

15. Apparatus according to claim 12, in which an air supply for an airflow towards the cooling region of the conveyor belt is provided in the region of the outlet of the housing or of a separate cooling-air inlet.

16. Apparatus according to claim 12, the cooling-air shaft having a conveying device for the cooling air.

17. Apparatus according to claim 12, wherein a cooling-air stream flows from the surroundings through a cooling-air inlet into the housing and cools the hot material in the cooling region by moving in the opposite direction to the hot material.

18. Apparatus according to claim 12, wherein the at least one cooling-air shaft connects a region of the cooling region adjacent to the capture region of the housing and removes at least part of the cooling-air stream from the cooling region.

19. Apparatus according to claim 12, wherein the at least one cooling-air shaft comprises only one entrance.

20. Apparatus according to claim 12, wherein a cooling-air stream may at least partially enter the combustion boiler though the material issue orifice during operation.

21. Apparatus according to claim 12, the at least one cooling-air shaft having means for the directed delivery of removed cooling air to at least a smoke-gas duct which is downstream from the combustion chamber of a combustion plant which carries combustion exhaust gases.

* * * * *